(12) United States Patent
Jung et al.

(10) Patent No.: US 7,887,890 B2
(45) Date of Patent: *Feb. 15, 2011

(54) METHOD OF MANUFACTURING PLASTIC SUBSTRATE USING PLASMA PROCESS AND PLASTIC SUBSTRATE MANUFACTURED USING THE METHOD

(75) Inventors: Gihune Jung, Seongnam (KR); Jinseok Kang, Suwon (KR); Hee Ju Kim, Seoul (KR); Ji Hyun Kwon, Kyungki-do (KR); Young Mee Lee, Daejeon (KR); Young Soo Seo, Daejeon (KR); In Soo Kim, Daejeon (KR)

(73) Assignees: LG Chem, Ltd. (KR); LG Life Sciences, Ltd. (KR)

( * ) Notice: Subject to any disclaimer, the term of this patent is extended or adjusted under 35 U.S.C. 154(b) by 527 days.

This patent is subject to a terminal disclaimer.

(21) Appl. No.: 11/507,352

(22) Filed: Aug. 21, 2006

(65) Prior Publication Data

US 2007/0087165 A1 Apr. 19, 2007

(30) Foreign Application Priority Data

Oct. 14, 2005 (KR) .................. 10-2005-0096950
Feb. 10, 2006 (KR) .................. 10-2006-0013007
Mar. 22, 2006 (KR) .................. 10-2006-0026044

(51) Int. Cl.
*C23C 14/02* (2006.01)
*C23C 14/12* (2006.01)
*C23C 14/58* (2006.01)
*H01H 1/46* (2006.01)
*G01N 1/44* (2006.01)
*G01N 23/22* (2006.01)

(52) U.S. Cl. .................. 427/534; 427/536; 427/2.11; 427/2.13; 427/491

(58) Field of Classification Search ................ None
See application file for complete search history.

(56) References Cited

U.S. PATENT DOCUMENTS 4,242,188 A * 12/1980 Niinomi et al. ............. 204/164

(Continued)

OTHER PUBLICATIONS

The Oxford Dictionary for Scientific Writers and Editors, Oxford University press, New York, 1991 (no month), excerpt p. 95 the and and.*

*Primary Examiner*—Marianne L Padgett
(74) *Attorney, Agent, or Firm*—Cantor Colburn LLP

(57) ABSTRACT

Provided is a method of manufacturing a plastic substrate with lower auto-fluorescence and better specificity. The method includes: (a) preparing a plastic substrate having an Atomic Force Microscopic (AFM) surface roughness of $R_a<3$ nm or $R_q<4$ nm under the condition of 50 μm×50 μm or less; (b) treating the plastic substrate with plasma; and (c) treating the plastic substrate with a surface-modifying monomer. A plastic substrate manufactured by the method is also provided. The plastic substrate exhibits a remarkably low auto-fluorescence and thus better specificity for detection of target biomolecules, which enables the broad application of a plastic substrate, which can be easily designed to include a microfluidic structure relative to a glass substrate but has been limitedly used due to high auto-fluorescence, to microarrays, biochips, or well plates. Furthermore, the method of manufacturing the plastic substrate enables an enhancement in the surface specificity of the plastic substrate and easy adjustment of the surface characteristics of the plastic substrate.

5 Claims, 4 Drawing Sheets (A) ARGON PLASMA TREATMENT (B) SURFACE MODIFICATION WITH ALLYLGLYCIDYLETHER (C) RADICAL TERMINATION BY HYDROGEN INCORPORATION

U.S. PATENT DOCUMENTS

| | | | | |
|---|---|---|---|---|
| 5,849,368 A * | 12/1998 | Hostettler et al. | ............ | 427/536 |
| 5,876,753 A * | 3/1999 | Timmons et al. | ............. | 427/488 |
| 5,976,466 A * | 11/1999 | Ratner et al. | .............. | 422/82.11 |
| 6,200,626 B1 * | 3/2001 | Grobe et al. | ................ | 427/2.24 |
| 6,436,481 B1 * | 8/2002 | Chabrecek et al. | ........... | 427/488 |
| 6,582,754 B1 * | 6/2003 | Pasic et al. | .................. | 427/2.24 |
| 6,673,533 B1 * | 1/2004 | Wohlstadter et al. | ............ | 435/6 |
| 6,682,782 B2 * | 1/2004 | Jung et al. | ................... | 427/497 |
| 2002/0102415 A1 * | 8/2002 | Valint et al. | .................. | 428/447 |
| 2007/0202612 A1 * | 8/2007 | Winter-Jensen et al. | ......... | 438/1 |
| 2008/0269685 A1 * | 10/2008 | Singh et al. | ................... | 604/173 |
| 2009/0305381 A1 * | 12/2009 | Bilek et al. | ................... | 435/180 |
| 2010/0089529 A1 * | 4/2010 | Barholm-Hansen et al. | . | 156/247 |
| 2010/0136246 A1 * | 6/2010 | Badyal et al. | ................ | 427/447 |
| 2010/0227372 A1 * | 9/2010 | Bilek et al. | ................... | 435/180 |
| 2010/0234240 A1 * | 9/2010 | Jehle | .............................. | 506/9 |

* cited by examiner (A) ARGON PLASMA TREATMENT (B) SURFACE MODIFICATION WITH ALLYLGLYCIDYLETHER (C) RADICAL TERMINATION BY HYDROGEN INCORPORATION (A) POSITION MARKER   (B) POSITIVE CONTROL   (C) THE PRESENT INVENTION

US 7,887,890 B2

METHOD OF MANUFACTURING PLASTIC SUBSTRATE USING PLASMA PROCESS AND PLASTIC SUBSTRATE MANUFACTURED USING THE METHOD

CROSS-REFERENCE TO RELATED PATENT APPLICATION

This application claims priority from Korean Patent Application No. 10-2005-0096950, filed on Oct. 14, 2005, No. 10-2006-0013007, filed on Feb. 10, 2006, and No. 10-2006-0026044, filed on Mar. 22, 2006, in the Korean Intellectual Property Office, the disclosures of which are incorporated herein in their entireties by reference.

1. Field of the Invention

The present invention relates to a method of manufacturing a plastic substrate with high specificity for detection of a target biomolecule, and a plastic substrate manufactured using the method.

2. Description of the Related Art

With development of the biotechnology, a DNA sequence, a protein sequence, etc. which contain the genetic information of an organism have been revealed. Thus, development of biochips for sequence determination, disease diagnosis, etc. has been actively performed. Biochips are tools where a high-density microarray of probe biomolecules, such as DNAs or proteins, is attached onto a substrate. The biochips can be classified into photolithographic chips, pin-spotting chips, inkjet-spotting chips, etc. according to a manufacturing method.

Biochips, in which a microarray of probe biomolecules is immobilized, determine the degree of binding affinity of target biomolecules with the probe biomolecules by detecting the degree of complementary base pairing between the probe biomolecules and the target biomolecules. Generally, the determination of the degree of binding affinity of target biomolecules with probe biomolecules is achieved using an optical method which includes: performing hybridization of fluorescent material-labeled target biomolecules with probe biomolecules and detecting a fluorescence signal emitted from the fluorescent material.

The best advantage of the microarray technique is to yield abundant biological information using a trace amount of a biomolecule (e.g., DNA or protein) sample. The biochip technology has been gradually expanded into the conceptual idea of a Lab-On-a-Chip (LOC) technology in which a probe biomolecule microarray is immobilized on a single chip, and a sample pretreatment, including the separation, purification, and amplification of target biomolecules, and a sample assay are performed on the single chip, into the conceptual idea of a Point-Of-Care (POC) technology that enables rapid diagnosis in emergency circumstances, and into the conceptual idea of an e-healthcare technology that can perceive and predict an individual's health condition regardless of time and location through combination of it with the information communication technology.

In the biochip technology, surface modification for immobilizing biomolecules on a substrate is the most fundamental technique. For this, a wet process is generally used. According to a conventional wet process, a diluted solution of a silane compound having a functional group, such as epoxide, amine, or aldehyde, with a solvent (e.g., ethanol) is coated on a glass substrate using a coating method is (e.g., dip coating) and then heated at 100° C. or more for one hour. At this time, the solvent may be selected from the group consisting of alcoholic solvents such as methanol, propanol, and butanol, in addition to ethanol; methylethylketone; and dimethylformamide. The coating method may be selected from various coating methods, such as spray coating or spin coating, in addition to dip coating.

However, the major technical limitation of the conventional wet process is that it is difficult to achieve partially different microscale surface modification. Thus, a new process technique capable of overcoming the technical limitation of the conventional wet process is required.

Meanwhile, various materials such as glass, silicone, or plastic have been used for manufacturing of microarray substrates. In particular, a plastic substrate is more advantageous in that it can be easily designed to include microstructures, can be easily mass-produced, and is cost-effective, relative to other substrates. However, the plastic substrate exhibits low specificity for detection of target biomolecules due to relatively high auto-fluorescence, and thus, its application has been limited.

SUMMARY OF THE INVENTION

While searching for a solution to the above problems, the present inventors found that when a plastic substrate manufactured to have a predetermined roughness was treated with plasma for surface modification, the auto-fluorescence from the plastic substrate was remarkably reduced, thereby ensuring good specificity for detection of biomolecules.

Therefore, the present invention provides a method of manufacturing a plastic substrate, which can reduce auto-fluorescence from the plastic substrate, enhance specificity for detection of biomolecules, and easily adjust the surface characteristics of the plastic substrate.

The present invention also provides a plastic substrate manufactured by the method, which exhibits lower auto-fluorescence and better specificity for detection of biomolecules.

According to an aspect of the present invention, there is provided a method of manufacturing a plastic substrate, the method including: (a) preparing a plastic substrate having an Atomic Force Microscopic (AFM) surface roughness of $R_a < 3$ nm or $R_q < 4$ nm under the condition of 50 μm×50 μm or less; (b) treating the plastic substrate with plasma; and (c) treating the plastic substrate with a surface-modifying monomer.

According to another aspect of the present invention, there is provided a plastic substrate having an AFM surface roughness of $R_a < 3$ nm or $R_q < 4$ nm under the condition of 50 μm×50 μm or less and being surface-treated with plasma and a surface-modifying monomer.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
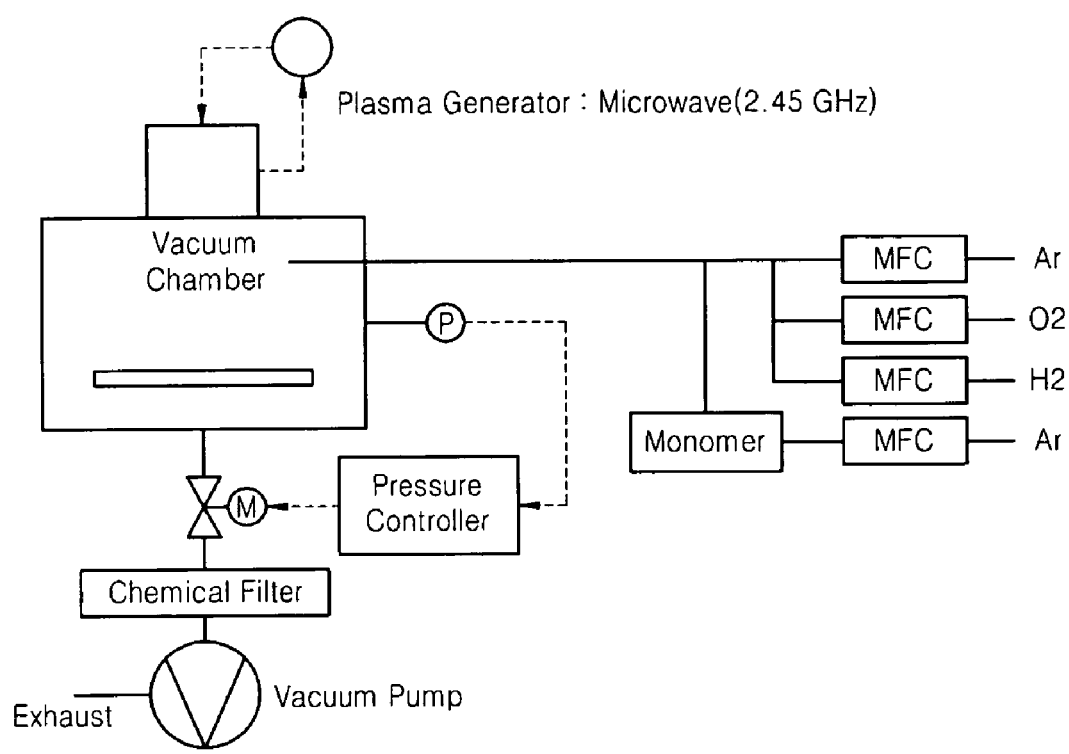
FIG. 1 is a schematic view illustrating a plasma generating apparatus used for plasma treatment in working examples of the present invention.

A method of manufacturing a plastic substrate according to the present invention will now be described in more detail step by step.

A method of manufacturing a plastic substrate according to the present invention includes preparing a plastic substrate having an Atomic Force Microscopic (AFM) surface roughness of $R_a<3$ nm or $R_q<4$ nm under the condition of 50 μm×50 μm or less.

The plastic substrate of the present invention may be made of a transparent resin selected from the group consisting of PolyStyrene (PS), Cyclo-Olefin-Copolymer (COC), and PolyCarbonate (PC) or a translucent resin selected from the group consisting of PolyPropylene (PP) and PolyEthylene (PE). Preferably, the plastic substrate may be made of a transparent resin. The plastic substrate must have chemical and heat resistance.

In the following working examples of the present invention, a plastic substrate made of a PS resin satisfying cost-effectiveness, low shrinkage, and proper heat-resistance was used. It was found that auto-fluorescence from a plastic substrate was significantly affected by local thermal decomposition and residual stress during processing, and the surface roughness of a mold, as well as the intrinsic properties of a resin and additives.

A plastic substrate having a lower surface roughness shows a significantly reduced auto-fluorescence (see Example 1 below). Specifically, the plastic substrate of the present invention has an AFM surface roughness of $R_a<3$ nm or $R_q<4$ nm under the condition of 50 μm×50 μm or less. Here, $R_a$ is an average roughness and $R_q$ is a root-mean-square roughness.

The plastic substrate having the low surface roughness according to the present invention can be manufactured using, e.g., an injection molding process. That is, the plastic substrate of the present invention can be manufactured to have a low surface roughness by plastic injection molding using a mold with a mirror-finished surface of an optical lens grade.

The method of manufacturing the plastic substrate according to the present invention also includes treating the plastic substrate with plasma.

The plasma may be argon plasma. Nitrogen or oxygen plasma is not preferred since various nitrogen or oxygen compounds, in addition to radicals, are generated on a surface of a plastic substrate.

The energy density of plasma defining the characteristics of the plasma is represented by W/FM where W is a power (J/sec) applied from a plasma generator, F is a flow rate of gas (mole/sec), and M is a molecular weight of the gas (g/mole). That is, the unit in the denominator is g/sec (F×M) and the unit in the whole part is J/g.

In the present invention, the plasma may be one of continuous plasma and pulsed plasma that have an energy density of $10^8$ J/kg or less. The pulsed plasma causes only minimal damage to a functional group relative to the continuous plasma.

In the present invention, the plasma treatment may be performed for 10 minutes or less.

In the present invention, the frequency of the plasma may be microwave frequency of 2.45 GHz or Radio Frequency (RF) of 13.56 MHz.

The plasma treatment of the present invention may be performed using a common method or apparatus. FIG. 1 schematically illustrates a plasma generating apparatus used for plasma treatment in the following working examples of the present invention.

The plasma used in the present invention is one of cold/vacuum plasmas, and thus, hardly causes a damage (e.g., thermal deformation) during the plasma treatment. Thus, the plasma treatment of the present invention can be applied to a plastic-like material. That is, the plasma treatment of the present invention is advantageous in that it can be applied to a plastic substrate, instead of an inorganic substrate, such as a glass substrate or a silicone substrate, taking into consideration that microstructure products as shown in FIG. 3B can be easily mass-produced in a cost-effective manner using a plastic material relative to glass or silicone. Furthermore, the plasma treatment of the present invention is performed by a dry process under vacuum, and thus, can achieve a very uniform surface treatment. Partially different surface modification can also be achieved using a micropatterned mask.

The method of manufacturing the plastic substrate according to the present invention also includes treating the plastic substrate with a surface-modifying monomer.

In the present invention, the surface-modifying monomer may be selected from the group consisting of epoxide group-containing monomers. Allylglycidylether (represented by Formula 1 below) and glycidylmethacrylate (represented by Formula 2 below) that have a carbon-carbon double bond are preferred. Thus, the plastic substrate may be surface-modified with an epoxide group. In terms of a reduction in auto-fluorescence from the plastic substrate, allylglycidylether is more preferred.

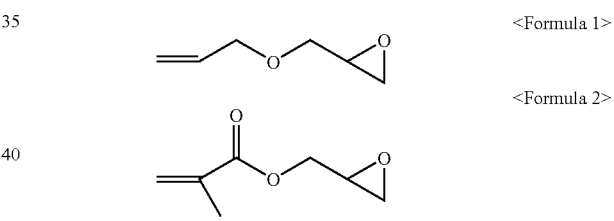

<Formula 1>

<Formula 2>

When the surface-modifying monomer contains an aldehyde group for surface-modification of the plastic substrate, it may be a compound having a higher boiling point, e.g., hexanal, octanal, nonanal, decanal, dodecylaldehyde, trans-2-pentenal, or trans-2-hexenal.

When the surface-modifying monomer contains an amine group for surface-modification of the plastic substrate, it may be selected from the group consisting of primary amine group-containing compounds, e.g., (3-aminopropyl)trimethoxysilane, 3-(diethylamino)propylamine, propylamine, butylamine, 1-amino-2-propanol, tris(2-aminoethyl)amine, isobutylamine, and isopentylamine. Allylamine having a carbon-carbon double bond and 3-methoxypropylamine which is an ether compound are more preferred.

In the present invention, the plasma treatment and the surface-modifying monomer treatment can be performed either subsequently or at the same time.

Figure 2:
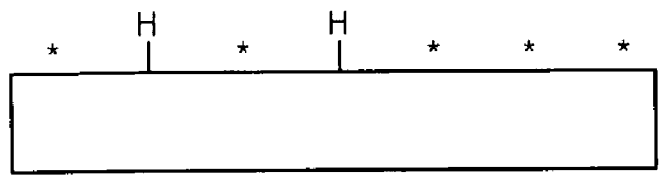
FIG. 2 is a schematic view illustrating a plasma treatment and a surface modification with allylglycidylether used as a surface-modifying monomer in a method of manufacturing a plastic substrate according to the present invention.
Figure 2:
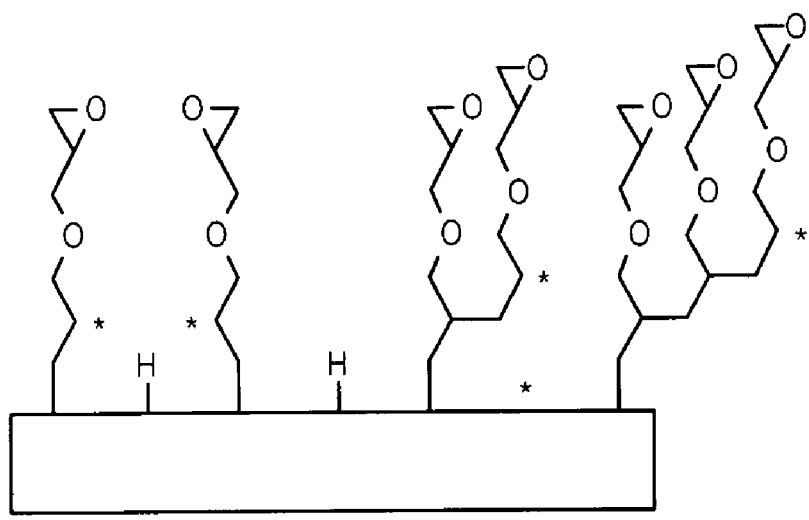
Figure 2:
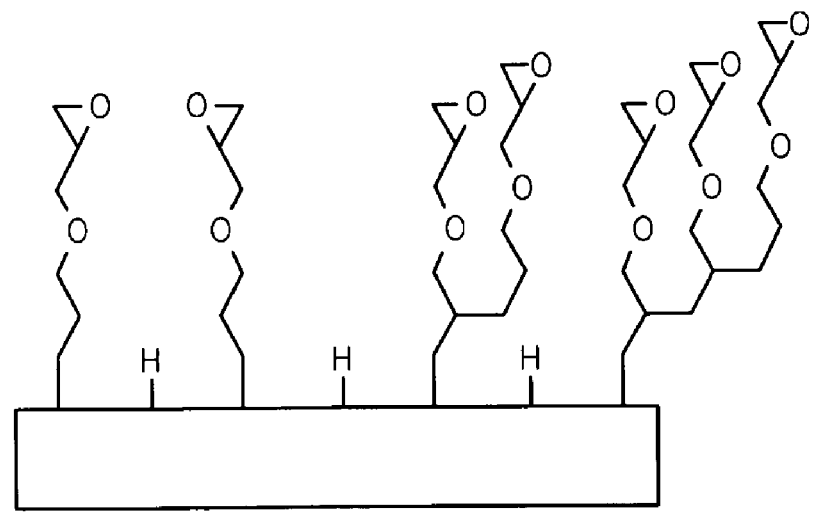

FIG. 2 schematically illustrates a plasma treatment and a surface modification with allylglycidylether used as a surface-modifying monomer in a method of manufacturing a plastic substrate according to the present invention. Through the procedure, an epoxide group is incorporated on a surface of the plastic substrate.

Referring (a) of FIG. 2, when a substrate is treated with argon plasma, the argon plasma does not chemically react with the substrate but generates radicals on the substrate. Referring to (b) of FIG. 2, the radicals react with a carbon-carbon double bond of a monomer and a radical transfer occurs, resulting in formation of various structural compounds. The most important feature of the present invention is that a compound formed on a plastic substrate can be controlled such that the specificity of the plastic substrate is enhanced, through adjustment of plasma treatment conditions. Referring to (c) of FIG. 2, a radical termination reaction is induced by hydrogen incorporation.

The method of manufacturing the plastic substrate according to the present invention may further include forming a microfluidic structure in the plastic substrate. The formation of the microfluidic structure may also be performed simultaneously with the preparation of the plastic substrate.

The present invention also provides a plastic substrate manufactured by the above method.

The plastic substrate of the present invention has an AFM surface roughness of $R_a<3$ nm or $R_q<4$ nm under the condition of 50 μm×50 μm or less, and is surface-treated with plasma and a surface-modifying monomer.

The plasma may be argon plasma. Also, the plasma may be one of continuous plasma and pulsed plasma that have an energy density of $10^8$ J/kg or less. The plasma treatment may be performed for 10 minutes or less. The frequency of the plasma may be microwave frequency of 2.45 GHz or RF of 13.56 MHz.

Preferably, the plastic substrate may be made of a transparent resin selected from the group consisting of PolyStyrene (PS), Cyclo-Olefin-Copolymer (COC), and PolyCarbonate (PC), or a translucent resin selected from the group consisting of PolyPropylene (PP) and PolyEthylene (PE).

The surface-modifying monomer may be one of allylglycidylether and glycidylmethacrylate having an epoxide group and a carbon-carbon double bond. Thus, the plastic substrate may be surface-modified with the epoxide group.

Alternatively, the surface-modifying monomer may be one of hexanal, octanal, and nonanal having an aldehyde group and a boiling point of 80° C. or more. Thus, the plastic substrate may be surface-modified with the aldehyde group.

Still alternatively, the surface-modifying monomer may be allylamine having a primary amine group and a carbon-carbon double bond or 3-methoxypropylamine which is an ether compound having a primary amine group. Thus, the plastic substrate may be surface-modified with the amine group.

Figure 3A:
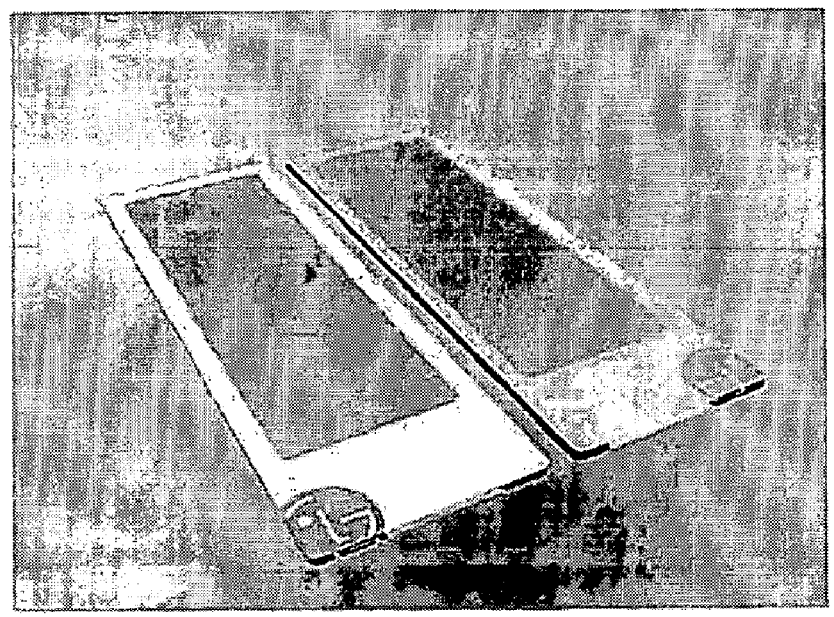
FIG. 3A is an image showing a plastic substrate according to the present invention.
Figure 3B:
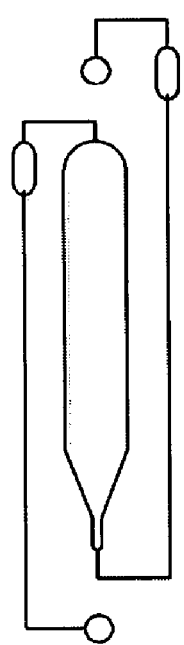
FIG. 3B is a schematic view illustrating a plastic substrate including a microfluidic structure according to the present invention.

FIG. 3A is an image showing a plastic substrate according to the present invention and FIG. 3B is a schematic view illustrating a plastic substrate including a microfluidic structure according to the present invention.

Figure 4:
FIG. 4 shows a fluorescence detection result for probe-target hybridization between probe biomolecules immobilized on a plastic substrate according to the present invention and target biomolecules.
Figure 4:
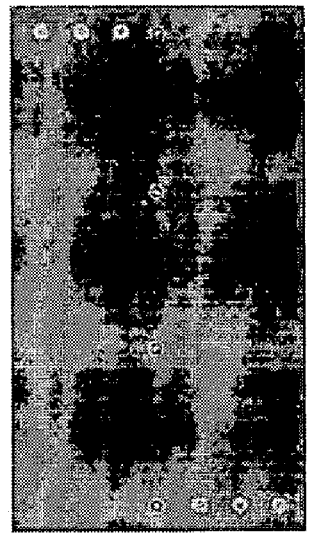
Figure 4:
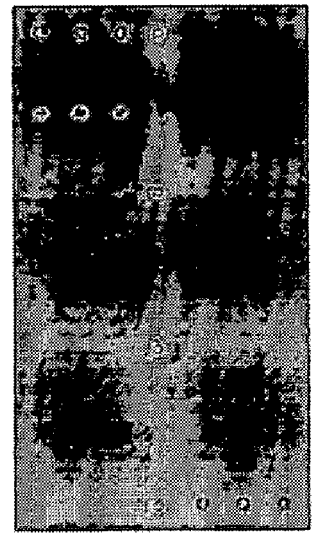

FIG. 4 shows a fluorescence detection result for probe-target hybridization between probe biomolecules immobilized on a plastic substrate according to the present invention and target biomolecules.

In the following working examples of the present invention, a fluorescence detection result for probe-target hybridization between probe biomolecules immobilized on a conventional glass substrate and target biomolecules was compared with a fluorescence detection result for probe-target hybridization between probe biomolecules immobilized on a plastic substrate manufactured by a method of the present invention and target biomolecules. According to the fluorescence detection results, the specificity of the plastic substrate of the present invention was much better than that of the conventional glass substrate.

Hereinafter, the present invention will be described more specifically with reference to the following working examples. The following working examples are for illustrative purposes and are not intended to limit the scope of the invention.

EXAMPLE 1

Evaluation of Auto-fluorescence According to Surface Roughness

In order to determine an effect of the surface roughness of a plastic substrate on auto-fluorescence, plastic substrates made of PS 15 NFI resin (LG Chemical Ltd., Korea) were manufactured using a mold with a generally mirror-finished surface and a mold with a mirror-finished surface of an optical lens grade.

The surface roughness of the plastic substrates thus manufactured was measured using an AFM. The critical value of the surface roughness was as follows: $R_a=3$ nm or $R_q=4$ nm under the condition of 50 μm×50 μm.

The auto-fluorescence from the plastic substrates was measured using a GenePix 4000B scanner (Axon). The auto-fluorescence measurement conditions were as follows: laser power of 100% and PhotoMultiplier Tube (PMT) level of 600.

The experimental results are presented in Table 1 below. As shown in Table 1, with respect to 532 nm laser irradiation, the level of auto-fluorescence from the plastic substrate manufactured using the mold with the mirror-finished surface of the optical lens grade was about 26% compared to that from the plastic substrate manufactured using the mold with the generally mirror-finished surface. With respect to 635 nm laser irradiation, the level of auto-fluorescence from the plastic substrate manufactured using the mold with the mirror-finished surface of the optical lens grade was about 44% compared to that from the plastic substrate manufactured using the mold with the generally mirror-finished surface.

From the above experimental results, it can be seen that auto-fluorescence from a plastic substrate can be reduced by lowering the surface roughness of the plastic substrate.

TABLE 1

| Mirror finish grade | Level of auto-fluorescence | |
| --- | --- | --- |
|  | 532 nm laser | 635 nm laser |
| General | 2992 | 442 |
| Optical lens grade | 782 | 194 |

EXAMPLE 2

Evaluation of Auto-fluorescence According to the Type of PS Resin

In order to evaluate the level of auto-fluorescence according to the type of PS resin, plastic substrates were manufactured using three commercially available PS resins, i.e., LG Chemical PS 15NFI, LG Chemical PS 25SPI, and BASF PS 147F. At this time, molds with a mirror-finished surface of an optical lens grade were used, and the auto-fluorescence measurement conditions were the same as those in Example 1.

The experimental results are presented in Table 2 below. As shown in Table 2, the levels of auto-fluorescence from the plastic substrates made of the three PS resins were significantly different. The level of auto-fluorescence from the plastic substrate made of LG Chemical PS 15NFI was the lowest. Such low auto-fluorescence of the plastic substrate made of LG Chemical PS 15NFI might be attributed to both the additives contained in the PS resin and very little local thermal decomposition and residual stress during processing. In particular, in comparison between the auto-fluorescence from the plastic substrates made of LG Chemical PS 15NFI and LG Chemical 25SPI which were similar in the additives, the auto-fluorescence from the plastic substrate made of LG Chemical PS 15NFI was lower than that from the plastic substrate made of LG Chemical PS 25SPI. This is because LG Chemical PS 15NFI has a lower molecular weight and better flowability relative to LG Chemical PS 25SPI, thereby causing very less local thermal decomposition and residual stress.

TABLE 2

| Type of PS resin | Level of auto-fluorescence | |
| --- | --- | --- |
| | 532 nm laser | 635 nm laser |
| LG Chemical PS 15NFI | 782 | 194 |
| LG Chemical PS 25SPI | 1558 | 308 |
| BASF PS 147F | 1800 | 747 |

EXAMPLE 3

Evaluation of Auto-fluorescence According to Plasma Treatment Time

Plastic substrates made of LG Chemical PS 15NFI resin were manufactured using molds with a mirror-finished surface of an optical lens grade in the same manner as in Example 1, and auto-fluorescence from the plastic substrates was measured according to a plasma treatment time.

A plasma generating apparatus used for the plasma treatment is schematically illustrated in FIG. 1. The plasma treatment was performed at an argon flow rate of 30 cc/min, under pressure of 20 Pa, with plasma power of 100 W, for up to 30 minutes at 5-minute intervals. At this time, a plasma energy density was $1.12 \times 10^8$ J/kg. Auto-fluorescence measurement conditions were the same as those in Example 1.

The experimental results are presented in Table 3 below. As shown in Table 3, the level of auto-fluorescence from the plastic substrates was increased with a linear increment of about 110 per one minute.

TABLE 3

| | Plasma treatment time (min) | | | | | |
| --- | --- | --- | --- | --- | --- | --- |
| | 5 | 10 | 15 | 20 | 25 | 30 |
| Level of auto-fluorescence under 532 nm laser irradiation | 1615 | 2253 | 2627 | 3171 | 3551 | 4641 |

EXAMPLE 4

Evaluation of Auto-fluorescence According to Plasma Power

Plastic substrates were manufactured in the same manner as in Example 3, and auto-fluorescence from the plastic substrates was measured according to plasma power. Plasma treatment was performed at an argon flow rate of 30 cc/min under pressure of 20 Pa for 10 minutes while increasing plasma power (up to 300 W at 50 W-intervals). At this time, a plasma energy density was a range from $5.61 \times 10^7$ J/kg to $3.36 \times 10^8$ J/kg. Auto-fluorescence measurement conditions were the same as those in Example 1.

The experimental results are presented in Table 4 below. As shown in Table 4, the level of auto-fluorescence from the plastic substrates was increased with a linear increment of about 110 per 10 W.

When taking all the results of Examples 3 and 4 into consideration, the level of auto-fluorescence after plasma treatment for 1 minute with plasma power of 100 W was the same as that after plasma treatment for 10 minutes with plasma power of 10 W due to the same energy amount (6 kJ).

TABLE 4

| | Plasma power (W) | | | | | |
| --- | --- | --- | --- | --- | --- | --- |
| | 50 | 100 | 150 | 200 | 250 | 300 |
| Level of auto-fluorescence under 532 nm laser irradiation | 1666 | 2253 | 2901 | 3092 | 3600 | 4239 |

EXAMPLE 5

Evaluation of Auto-fluorescence According to Pressure

Plastic substrates were manufactured in the same manner as in Example 3, and auto-fluorescence from the plastic substrates was measured according to pressure. Plasma treatment was performed at an argon flow rate of 30 cc/min with plasma power of 100 W for 10 minutes while increasing pressure (up to 100 Pa at 20 Pa-intervals). A this time, a plasma energy density was $1.12 \times 10^8$ J/kg, and auto-fluorescence measurement conditions were the same as those in Example 1.

The experimental results are presented in Table 5 below. As shown in Table 5, auto-fluorescence according to pressure was insignificantly increased. Cold/vacuum plasma used in the present invention generates no plasma with an increase in pressure.

TABLE 5

| | Pressure (Pa) | | | | |
| --- | --- | --- | --- | --- | --- |
| | 20 | 40 | 60 | 80 | 100 |
| Level of auto-fluorescence under 532 nm laser irradiation | 2253 | 2364 | 2669 | 2615 | 2620 |

EXAMPLE 6

Evaluation of specificity of plastic substrates where probe biomolecules having similar nucleotide sequences are immobilized Plastic substrates were manufactured in the same manner as in Example 3 and then surface-modified with an epoxide group using a plasma process.

The plasma process was divided into two steps. In the first plasma treatment, radicals were incorporated on the plastic substrates using argon plasma under the conditions of an argon flow rate of 20 cc/min, a pressure of 20 Pa, plasma power of 100 W, and a treatment time of one minute. At this time, a plasma energy density was $1.68 \times 10^8$ J/kg.

The second plasma treatment was performed using a mixed plasma of argon with an allylglycidylether monomer. At this time, an argon flow rate and a pressure were the same as those in the first plasma treatment, and a plasma treatment time was 5 minutes. In order to minimize damage to a functional group and an increase in auto-fluorescence, plasma with power of 100 W was applied in a pulsed manner. A plasma pulse cycle was as follows: 1 sec, 2 sec, 5 sec, and infinite. In each cycle, a pulse on-time was 100 msec. In the pulse cycle of 1 sec, a pulse off-time was 900 msec and a pulse on-time was 100 msec. Finally, a radical termination reaction using hydrogen was performed to thereby produce epoxide-modified plastic substrates.

Two types of probe biomolecules (SEQ ID NOS: 1 and 2) were immobilized on the epoxide-modified plastic substrates. The two types of probe biomolecules were similar in nucleotide sequence and difficult to distinguish, using a piezoelectric microarrayer (Perkin-Elmer). The reaction conditions were as follows: a 3×SSC buffer, 0.01% SDS, 60° C., 70% RH, 16 hours. The resultant plastic substrates were incubated in a 50° C. 50 mM Tris-HCl (pH 9.0) solution for 30 minutes, washed twice with 0.2% SDS for 2 minutes and then twice with distilled water for 2 minutes, centrifuged at 1,000 rpm for 5 minutes, and dried.

Meanwhile, fluorescently-labeled PCR products were used as target biomolecules and mixed with a hybridization solution (3×SSC, 0.001% SSC) in a mixture ratio of 1:20. The reaction solution was incubated at 55° C. for 30-60 minutes, washed with a 1×SSC buffer at room temperature for 5 minutes and then with a 0.1×SSC buffer for 2 minutes, and dried at room temperature. Fluorescence measurement conditions were the same as the auto-fluorescence measurement conditions of Example 1.

The two types of the probe biomolecules were immobilized on the plastic substrate. The two types of the probe biomolecules were similar in nucleotide sequence and difficult to distinguish. The specificity of the plastic substrate was presented in Table 6 below. Here, specificity was given by:

Specificity=(fluorescence signal of target $A1$ reacting with probe $A1$)/(fluorescence signal of target $A1$ reacting with probe $A2$)

A commercially available epoxide-modified glass substrate manufactured using a conventional wet process was used as a control.

As shown in Table 6, detection specificity of the plastic substrates where similar biomolecules difficult to distinguish were immobilized was increased with an increase in plasma pulse cycle.

TABLE 6

| Section | Control | Cycle: 1 sec | Cycle: 2 sec | Cycle: 5 sec | Cycle: infinite |
|---|---|---|---|---|---|
| Specificity | 1.3 | 1.8 | 5.3 | 6.3 | 7.2 |

EXAMPLE 7

Specificity Evaluation

Detection specificity of plastic substrates according to the present invention, on which probe biomolecules B, C, and D (SEQ ID NOS: 3, 4, and 5, respectively) having relatively good specificity were immobilized, was evaluated in the same manner as in Example 6. The plastic substrates used in Example 7 were manufactured in the same manner as in Example 6 except a plasma pulse cycle of 3 sec. Conventional epoxide-modified glass substrates were used as a control.

The specificity results are presented in Table 7 below. As shown in Table 7, the specificity of the plastic substrates according to the present invention was about 2-fold higher than that of the conventional glass substrates. In particular, the plastic substrates according to the present invention exhibited much higher specificity for low-concentration target biomolecules than the conventional glass substrates.

TABLE 7

| | | | Target D | |
|---|---|---|---|---|
| Section | Target B | Target C | Conc.: 100 copies | Conc.: 100,000 copies |
| Plastic substrate of the invention | 84 | 16 | 33 | 67 |
| Control | 20 | 9 | 6 | 24 |
| Enhancement | 4.2-fold | 1.8-fold | 5.5-fold | 2.8-fold |

EXAMPLE 8

Specificity Evaluation

Plastic substrates surface-modified with an aldehyde group were manufactured in the same manner as in Example 6 except that octanal was used as a surface-modifying monomer and a pulse cycle was 0.5 sec.

As controls, there were used conventional aldehyde-modified glass substrates and aldehyde-modified plastic substrates (manufactured by a wet process, Greiner Bio-One).

Probe biomolecules E, F, G, and F1 (SEQ ID NOS: 6, 7, 8, and 9, respectively) were immobilized on the aldehyde-modified plastic substrates of the present invention and the two types of the control substrates in the same manner as in Example 6 except that the aldehyde-modified substrates were incubated in 0.625 g of NaBH$_4$/(120 mL 100% EtOH+375 mL 1×PBS) solution for 10 minutes for aldehyde reduction.

The specificity results are presented in Table 8 below. As shown in Table 8, the specificity of the plastic substrates according to the present invention was equivalent to that of the conventional glass substrates and much higher than that of the conventional plastic substrates.

Specificity for detection of target F, which was determined by dividing a fluorescence signal of the target F reacting with the probe F by a fluorescence signal of the target F reacting with the probe F1, was wholly low. This is because it is difficult to distinguish the probe F and the probe F1 which are similar in nucleotide sequence.

TABLE 8

| Section | Target E | Target F | Target G |
|---|---|---|---|
| Plastic substrate of the invention | 28 | 3 | 29 |
| Glass substrate (control) | 31 | 2 | 30 |
| Plastic substrate (control) | 10 | 1.5 | 9 |

EXAMPLE 9

Specificity Evaluation

Plastic substrates surface-modified with an amine group were manufactured in the same manner as in Example 6 except that 3-methoxypropylamine was used as a surface-modifying monomer and a pulse cycle was 5 sec. Conventional amine-modified plastic substrates (manufactured by a wet process, Greiner Bio-One) were used as a control.

Probe biomolecules H, I, and J (SEQ ID NOS: 10, 11, and 12, respectively) were immobilized on the plastic substrates in the same manner as in Example 6 except that PCR products were used as the probe biomolecules and the reaction temperature was set to 80° C. Due to the characteristics of the used probe biomolecules, thermal denaturation was needed. For this, the probe biomolecules were treated with 100° C. distilled water for 2 minutes.

The specificity results are presented in Table 9 below. As shown in Table 9, the specificity of the plastic substrates according to the present invention was equivalent to that of the conventional plastic substrates manufactured by the wet process.

TABLE 9

| Section | Target H | Target I | Target J |
|---|---|---|---|
| Plastic substrate of the invention | 3.3 | 2.3 | 3.0 |
| Control | 1.6 | 2.4 | 1.5 |

As described above, a plastic substrate of the present invention shows a remarkably low auto-fluorescence and thus better specificity for detection of target biomolecules, which enables broad application of a plastic substrate, which can be easily designed to include a microfluidic structure relative to a glass substrate but has been limitedly used due to great auto-fluorescence, to microarrays, biochips, or well plates. Furthermore, according to the present invention, the surface specificity of a substrate can be enhanced and the surface characteristics of a substrate can be easily adjusted.

What is claimed is:

1. A method of manufacturing a bio-chip substrate, the method comprising:
   (a) preparing a plastic substrate having an Atomic Force Microscopic (AFM) surface roughness of $R_a$<3 nm or $R_q$<4 nm before being treated, wherein $R_a$ is an average roughness and $R_q$ is a root-mean-square roughness;
   (b) treating the plastic substrate with argon plasma to form a radical on the surface of the plastic substrate; and then
   (c) treating the plastic substrate with a surface-modifying monomer, wherein the radical is reacted with the surface-modifying monomer to form a compound on the surface of the plastic substrate,
   wherein the surface-modifying monomer is one of allylglycidylether having an epoxide group and a carbon-carbon double bond, and glycidylmethacrylate having an epoxide group and a carbon-carbon double bond, the plastic substrate being surface-modified with the epoxide group; one of hexanal, octanal, and nonanal each of which has an aldehyde group and a boiling point of 80° C. or higher, the plastic substrate being surface-modified with the aldehyde group; or one of allylamine having a primary amine group and a carbon-carbon double bond, and 3-methoxypropylamine which is an ether compound having a primary amine group, the plastic substrate being surface-modified with the amine group; and
   (d) preparing the plastic substrate treated in (c) as the bio-chip substrate to be used with fluorescent material-labeled biomolecules to be detected by fluorescent measurement.

2. The method of claim 1, wherein the argon plasma is one of continuous plasma having an energy density of $10^8$ J/kg or less and pulsed plasma having an energy density of $10^8$ J/kg or less, wherein the energy density of plasma is represented by W/FM where W is a power (J/sec) applied from a plasma generator, F is a flow rate of gas (mole/sec), and M is a molecular weight of the gas (g/mole).

3. The method of claim 2, wherein (b) is performed for 10 minutes or less.

4. The method of claim 1, wherein the frequency of the argon plasma is microwave frequency of 2.45 GHz or radio frequency of 13.56 MHz.

5. The method of claim 1, wherein the plastic substrate is selected from the group consisting of PolyStyrene (PS), Cyclo-Olefin-Copolymer (COC), PolyCarbonate (PC) PolyPropylene (PP) and PolyEthylene (PE).

* * * * *

UNITED STATES PATENT AND TRADEMARK OFFICE
CERTIFICATE OF CORRECTION

PATENT NO.         : 7,887,890 B2                                        Page 1 of 1
APPLICATION NO.    : 11/507352
DATED              : February 15, 2011
INVENTOR(S)        : Gihune Jung et al.

It is certified that error appears in the above-identified patent and that said Letters Patent is hereby corrected as shown below:

On the Title Page, Item (73) Assignees,

Delete: "LG Chem, Ltd. (KR); LG Life Sciences, Ltd. (KR)"

and

Insert/Replace with: --LG Life Sciences, Ltd. (KR)--

Signed and Sealed this
Twenty-eighth Day of June, 2011

David J. Kappos
*Director of the United States Patent and Trademark Office*

SEQUENCE LISTING

```
<160> NUMBER OF SEQ ID NOS: 12

<210> SEQ ID NO 1
<211> LENGTH: 14
<212> TYPE: DNA
<213> ORGANISM: Artificial Sequence
<220> FEATURE:
<223> OTHER INFORMATION: probe

<400> SEQUENCE: 1
ggcaacaaca cgca                                                      14

<210> SEQ ID NO 2
<211> LENGTH: 14
<212> TYPE: DNA
<213> ORGANISM: Artificial Sequence
<220> FEATURE:
<223> OTHER INFORMATION: probe

<400> SEQUENCE: 2
gacaacaaca ccca                                                      14

<210> SEQ ID NO 3
<211> LENGTH: 14
<212> TYPE: DNA
<213> ORGANISM: Artificial Sequence
<220> FEATURE:
<223> OTHER INFORMATION: probe

<400> SEQUENCE: 3
ggcaacaaca cgca                                                      14

<210> SEQ ID NO 4
<211> LENGTH: 15
<212> TYPE: DNA
<213> ORGANISM: Artificial Sequence
<220> FEATURE:
<223> OTHER INFORMATION: probe

<400> SEQUENCE: 4
cacttgttgg gatgc                                                     15

<210> SEQ ID NO 5
<211> LENGTH: 15
<212> TYPE: DNA
<213> ORGANISM: Artificial Sequence
<220> FEATURE:
<223> OTHER INFORMATION: probe

<400> SEQUENCE: 5
caccacttca accga                                                     15
```

```
<210> SEQ ID NO 6
<211> LENGTH: 22
<212> TYPE: DNA
<213> ORGANISM: Artificial Sequence
<220> FEATURE:
<223> OTHER INFORMATION: probe

<400> SEQUENCE: 6
ccaactttgt tgtcatgcac cc                                             22

<210> SEQ ID NO 7
<211> LENGTH: 15
<212> TYPE: DNA
<213> ORGANISM: Artificial Sequence
<220> FEATURE:
<223> OTHER INFORMATION: probe

<400> SEQUENCE: 7
ccacgcggac tggcc                                                     15

<210> SEQ ID NO 8
<211> LENGTH: 22
<212> TYPE: DNA
<213> ORGANISM: Artificial Sequence
<220> FEATURE:
<223> OTHER INFORMATION: probe

<400> SEQUENCE: 8
gcgacaccac ccaaaacaaa cc                                             22

<210> SEQ ID NO 9
<211> LENGTH: 19
<212> TYPE: DNA
<213> ORGANISM: Artificial Sequence
<220> FEATURE:
<223> OTHER INFORMATION: probe

<400> SEQUENCE: 9
cggaccgagt gttgtctca                                                 19

<210> SEQ ID NO 10
<211> LENGTH: 279
<212> TYPE: DNA
<213> ORGANISM: Artificial Sequence
<220> FEATURE:
<223> OTHER INFORMATION: probe

<400> SEQUENCE: 10
aaggagcacc acgaaaagca cttcaattgg tggagtgcga gccgtgaggg gttctcgtct    60
gtagtggacg aaaaccgggt gcacaacagc aaataattgc cagacacact attgggccct   120
gagacaacac tcggtcgatc cgtgtggagt ccctccatct tggtggtggg gtgtggtgtt   180
tgagtattgg atagtggttg cgagcatcta gatgaacgcg tggtccttcg tggccggcgt   240
tcatcaaaat gtgtaatttc ttctttggtt tttgtgtgt                          279

<210> SEQ ID NO 11
<211> LENGTH: 275
<212> TYPE: DNA
<213> ORGANISM: Artificial Sequence
<220> FEATURE:
<223> OTHER INFORMATION: probe

<400> SEQUENCE: 11
aaggagcacc acgaaaacgc cccaactggt ggggcgtagg ccgtgagggg ttcttgtctg    60
```

-continued

```
tagtgggcga gagccgggtg catgacaaca aagttggcca ccaacacact gttgggtcct    120
gaggcaacac tcggacttgt tccaggtgtt gtcccaccgc cttggtggtg gggtgtggtg    180
tttgagaact ggatagtggt tgcgagcatc aatggatacg ctgccggcta gcggtggcgt    240
gttctttgtg caatattctt tggtttttgt tgtgt                               275

<210> SEQ ID NO 12
<211> LENGTH: 273
<212> TYPE: DNA
<213> ORGANISM: Artificial Sequence
<220> FEATURE:
<223> OTHER INFORMATION: probe

<400> SEQUENCE: 12
ctaaggagca ccacgaaaag cgccccaact ggtggggtgc aagccgtgag gggttctcgc     60
ctgtagtggg cgggggccgg gtgcgcaaca gcaaatgatt gccagacaca ctattgggcc    120
ctgagacaac actcggccag tccgcgtggt gtcccccccat cttggtggtg gggtgtggtg    180
tttgagtatt ggatagtggt tgcgagcatc taaacggatg cgctgcccgt agggacgcgt    240
attcgttttg tgtaatttct tctttggttt ttg                                 273
```